United States Patent [19]

Mertel

[11] 3,980,831
[45] Sept. 14, 1976

[54] DATA SWITCHING SYSTEM

[75] Inventor: Heinz Mertel, Hohenschaftlarn, Germany

[73] Assignee: Siemens Aktiengesellschaft, Munich, Germany

[22] Filed: Apr. 30, 1975

[21] Appl. No.: 573,600

[30] Foreign Application Priority Data
Apr. 30, 1974  Germany............................ 2421002

[52] U.S. Cl. ................................ 179/2 R; 179/1 B
[51] Int. Cl.² ................ H04M 11/06; H04M 11/08
[58] Field of Search ................ 179/1 B, 1 SW, 2 R, 179/2 A, 2 E, 2 TS, 15 R

*Primary Examiner*—George G. Stellar
*Attorney, Agent, or Firm*—Gerald L. Lett

[57] ABSTRACT

A data switching system having a number of subscriber sets connected over a broad band transmission line capable of handling traffic within and without the voice frequency range to a switching center is described. The system handles transmissions of audio and video telephone conversations, television programs and data communications between connected parties. Subscriber sets are provided which have, in addition to the usual telephone circuit and character generator, a video receiver and transmitter, data terminals used as control elements and a common control device. The latter is connected over a subscriber line to the switching center for enabling the operation of the control elements as needed for the selected operating mode. In the switching center the subscriber line is connected parallel with more than one input of a multisectional switching network. One of the aforementioned inputs receives telephone traffic, another receives radio and television programs and others are used for video telephone and other data traffic in one or two directions. The various coupling elements in the switching network are operable independently of one another.

13 Claims, 2 Drawing Figures

DATA SWITCHING SYSTEM

BACKGROUND OF THE INVENTION

The invention relates to a data switching system comprising a number of subscriber sets, each being connected over a subscriber line suitable for data transmission within and without the voice frequency range to a switching center. This enables the transmission of various types of communications, such as telephony, television, video telephony, data communication, between the parties, or with other stations, e.g., television transmitters or data processing systems. Systems of this type are well known, as indicated by U.S. Pat. Nos. 3,711,648 and 3,665,311, and the publication "Wireless World", October 1973, pp. 506–509.

Thus, the invention concerns switching systems for data transmission, using the voice frequency range as well as broader bands, the subscriber sets being provided with voice and broadband capabilities which may be controlled selectively by the users.

An object of the invention is to provide an improved construction of the subscriber sets used in the above described systems in which control by the user is improved.

SUMMARY OF THE INVENTION

In accordance with the invention, the foregoing and other objects are achieved in that subscriber sets connected to the data switching system, in addition to a telephone circuit and a character generator for handling the normal telephone traffic, can be equipped with a video receiver, an audio receiver, a video transmitter and with other data terminals as control elements. A common control device is provided for connection, by means of the subscriber line, to the switching center for enabling the operation of the control elements in the combination needed for a particular operating mode.

In the switching center the subscriber line is connected in parallel with more than one input of a multisectional switching network over a trunk termination. One input handles the telephone traffic, one input handles television and radio programs and one further input alone, or in conjunction with the input for telephony, is used for transmitting other video and data signals in one or in both directions. The coupling elements accessible over the separate inputs are operable independently of one another.

Instead of complete control devices for the individual services, only the functional elements necessary for all service features are provided in the subscriber set and are enabled in the desired combination in conjunction with the control equipment. By way of example, a single video receiver can, thereafter, be employed in conjunction with the audio receiver as a television receiver, in conjunction with the speech circuit as a video telephone or in conjunction with a data output keyboard as a data display device. In conjunction with the trunk termination in the switching center, the insertion of the common control device in the subscriber set enables, at the same time, a uniform signaling for all operating modes, whereby the coupling element accessible over the individual inputs of the switching networks, because of their independent operation, ensure maximum flexibility as the different connections are being established and not mutually exclusive services from a subscriber set are being used concurrently.

When a functional element is put into service by the user, a signal specifying the operating mode is sent automatically to the switching center, whereby, for example, a logic circuit of the control device monitors the putting into service of the individual control elements, ascertains the selected operating mode, and causes transmission to the switching center of the control signal identifying the selected operating mode. However, a more convenient control possibility is offered the user if the control device is equipped with mode selector switches, upon the actuation of which the control elements needed for the selected operating mode differing from normal telephony are enabled. The control signal identifying the selected operating mode is sent to the switching center.

Further advantages are obtained if the character generator as a calling equipment is likewise employed for selecting prearranged programs or services within the scope of a selected operating mode, e.g., for the selection of television and radio programs.

The particular mode of operation obtained in the switching center from the received mode signals remains conveniently stored, and the received signals of the character generator are interpreted suitably differently. To be able to assign the signals of the character generator to one of two operating modes (e.g., television and telephony) as they are being used concurrently, when two separate service features are being employed simultaneously, a signal is transmitted to the switching center ensuring assignment of the pulsing signals to one of the possible operating modes. This is in addition to the pulsing signals sent from the character generator of the subscriber set. Upon completion of an operating mode, a sign-off signal is sent to the switching center and the identification is annulled.

There are further advantages if the signals of the character generator and the mode signals are transferred in the speech band.

According to a further development of the invention, a priority position is assigned to telephony in that the speech circuit and the character generator are powered from the switching center over the subscriber line and that telephone calls coming in when the speech band is not in use are also received when control elements working outside the speech band are in operation. Thus, the user is accessible by phone to the same extent as with conventional telephone systems despite the manifold service features.

According to another development of the invention, there is the possibility of operating several television and/or radio sets in a subscriber set independently of one another. This can occur if the terminal connection of the switching network for the transmission of television and radio programs has access over parallel coupling elements to one and the same program in different communication channels for the simultaneous transmission of various programs and the various receivers of the subscriber set have converters set to the communication channels assigned individually thereto. The extra receivers of the subscriber set are conveniently equipped with an individual program selector controlling the program selection in the switching center over the generator for the operating-mode control signals.

BRIEF DESCRIPTION OF THE DRAWINGS

The principles of the invention will be more readily understood by reference to a description of a preferred embodiment given below in conjunction with the drawings which are briefly described as follows.

DETAILED DESCRIPTION OF A PREFERRED EMBODIMENT

Figure 1:
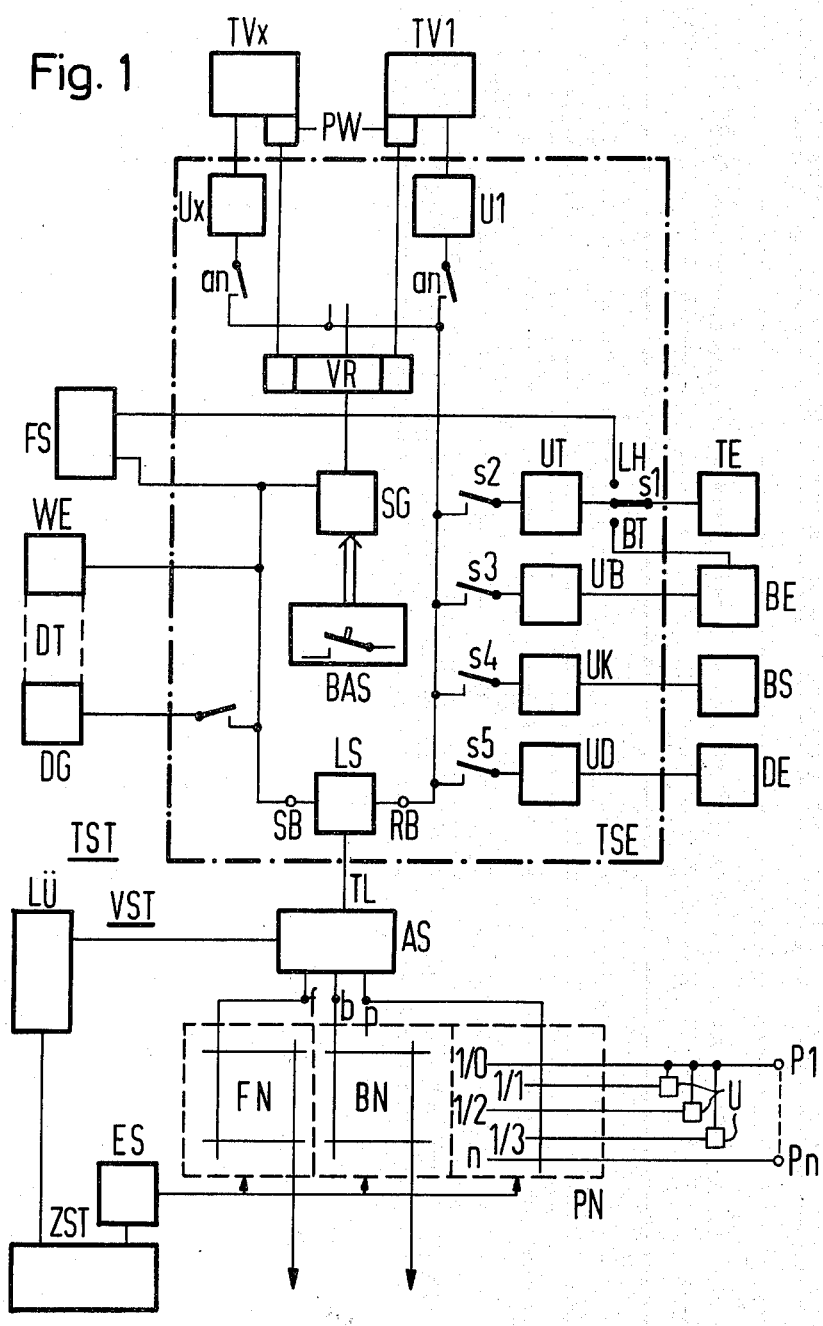
FIG. 1 is a schematic diagram illustrating a subscriber set and switching center constructed according to the invention.

Referring to FIG. 1, a subscriber set TST includes a control device TSE and the control elements connected thereto.

The control elements are a telephone circuit FS and a character generator WE serving as a calling equipment for handling the telephone traffic. The character generator WE may also be part of an enlarged keyboard DT for simple data traffic. A further data generator and/or receiver DG operates in the speech band. This may be a tape reader in the outgoing direction and a printer in the incoming direction. Also shown in the drawing are an audio receiver TE, a video receiver BE, a video transmitter BS in the form of a camera, and a data terminal DE for the broadband range. All these devices are preceded by a converter UT, UB, UK, UD in the form of modulators or demodulators. All of the foregoing devices are of known construction. The control device further comprises a trunk circuit LS which in a known manner branches the telephone channel disposed in the speech band SG from the other communication channels RB of the broadband transmission.

In the preferred embodiment, the control device TSE is equipped with a control desk having a switch BAS for every possible operating mode, upon the actuation of which the combination of control elements required for the relevant mode is enabled for use. The control elements are connected over contacts $s2$ to $s5$ to the trunk circuit RB. Another switch $s1$ enables the direct connection of the audio receiver TE to the speech FS when the equipment is used for speakerphone (position LH) or to the video receiver BE when used for television (position BT). Moreover, a control signal is sent to the switching center VST by the signal generator SG upon actuation of a switch BAS. This control signal indicates the desired mode thereat so that the characters sent subsequently by the character generator WE can be interpreted suitably differently, e.g., as a directory number character for setting up a telephone call or as program identifiers for selecting the associated radio or television programs.

The subscriber set TST is merely a combination of known components selected to produce the functions described herein. The main constituents of a subscriber set are the individual devices which are connectable to a subscriber line in a desired combination by a specific contact arrangement through operation of selector switches BAS and their associated contacts. By this means, a signal indicating the desired operating mode is communicated to the switching center VST.

In addition to this basic equipment of the subscriber set TST, further audio or video/audio receivers TV may be connected to the control device TSE. These receivers are equipped with their own program selector PW, to which, likewise, a converter U1 to U$x$ is assigned. In contrast to the other converters UT, UB, UK and UD, an individual channel is allocated to these converters so that various programs can be transmitted concurrently.

The monitoring of control requests for the extra receivers TV1 to TV$x$ is effected by means of a monitoring circuit VR which also operates the contacts for the connection of the devices to the trunk repeater RB. Program selectors PW control, over the monitoring circuit VR, signal generator SG, which, instead of the signal generator WE, sends the program selection signals for the switching center. The additional audio or video receivers TV are not bound by the location of the control device TSE, but may be placed independently thereof and connected via sockets.

A line termination circuit AS forms an input circuit in the switching center VST for each subscriber station TST. Line termination circuit AS has switching elements which, in conjunction with the line monitoring circuit LÜ, enable monitoring of the busy/idle status and the reception of the characters sent from the character generator WE and the signal generator SG to the subscriber set. Also, the trunk termination has switching elements which in a manner in itself known couple the broadband subscriber line TL to the terminals $f$, $p$ and $b$ of the various switching networks: FN for telephone traffic, PN for the transmission of radio and/or television programs, and BN for other broadband communication. These switching networks may be constructed in any of the several known ways for carrying out the functions assigned to them and equipped with coupling switches which can be controlled independently of one another. While the switching networks FN and BN may normally be constructed with more than one stage, a single-stage construction suffices for the switching network PN, since only one through-connection to one of the program buses P1 to P$n$ is required.

In order that various programs can be transmitted concurrently to a connected subscriber set TST, each program bus, e.g., P1 is connected to a converter U and to several coupling switches of the switching network PN leading to the same subscriber line for conversion into different channels, e.g. 0 to 3.

Thus, with a maximum number of $z$ additional devices in a subscriber set, a total of $z.n$ converters U are needed for $n$ programs. Such trunking is of particular advantage whenever the majority of subscriber sets are equipped with the maximum number of attachments. If this is the case, this will in certain circumstances result in less expense if the output $p$ of the trunk termination AS only in case of necessity is connected in parallel with directly assigned converters for each attachment. The attachments are then connectable by coupling switches of the switching network PN to the program bus selected in each case. The number of converters corresponds in this case to the number of attachments, and the converters may be designed for use with less power. A combination of the two approaches is likewise conceivable without further provision and might in many cases yield the best results.

The positioning of the switching networks occurs in the known manner by a common or by separate adjusting means ES, whereby a central control unit ZST controls in a known manner all the switching operations in the switching center VST.

The construction of switching center VST fully corresponds to that of prior art switching centers as described in U.S. Pat. Nos. 3,665,311 and 3,711,648. Using the structures described in these patents several switching networks can be connected to the individual subscriber lines as needed for the particular time or frequency allocation scheme used. Line termination circuit AS can be arranged to perform its matching function in accordance with the selected time or frequency allocation scheme.

The broadband subscriber line TL connecting trunk circuit LS in the subscriber set TST with the trunk termination LS in the switching center VST may be constructed as a conventional four-wire line. However, coaxial cables or glass fiber lines are likewise possible. The signaling by the character generator WE and the signal generator SG of the subscriber set can occur in any known manner, preferably in accordance with a multifrequency encoding procedure. As the speech circuit is being powered through the switching center, DC signaling is also possible, at least for the traffic supervision.

In the preferred embodiment, a frequency-band allocation scheme is assumed, i.e., the fixing of the required channels occurs by means of carrier frequencies and filter arrangements tuned to those carrier frequencies. A time allocation scheme by assigning phases of a transmission cycle to the individual channels is likewise possible without further provision and without departing from the inventive concept. It does not matter whether the message is transmitted in analog or digital form.

Figure 2:
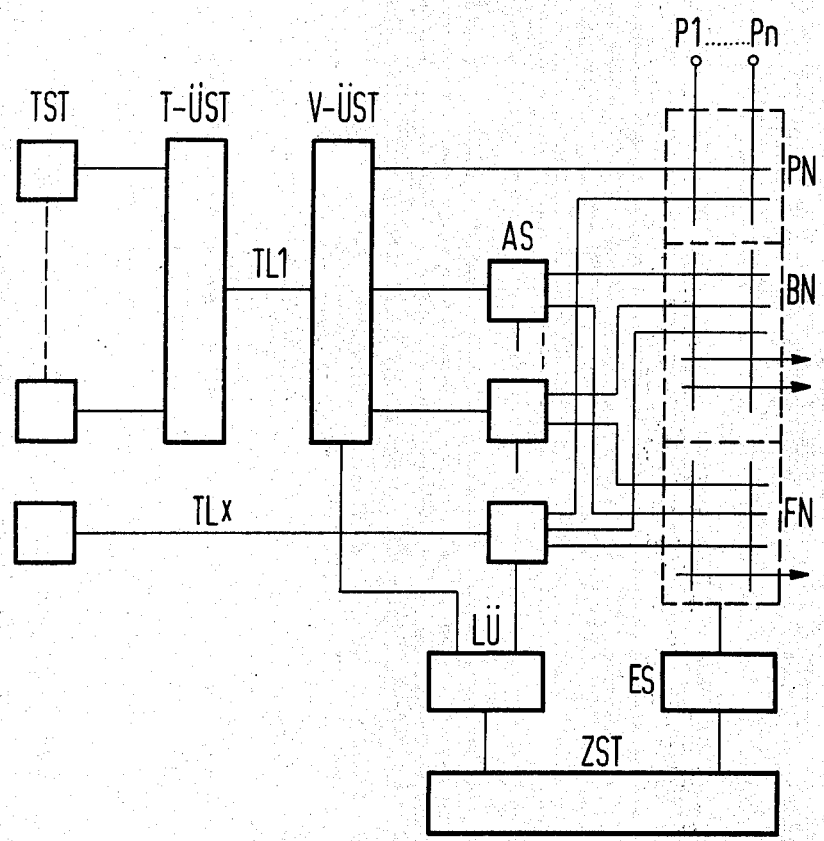
FIG. 2 is a block schematic diagram illustrating an alternative way of interconnecting subscriber sets with the switching center in accordance with the invention.

The preferred embodiment of the invention is directed toward the individual connection. In departure therefrom, other forms of construction are possible, as likewise offered by a conventional telephone system:

1. In addition to a single subscriber set (as shown in the schematic diagram of FIG. 2 based on FIG. 1), also a plurality of such subscriber sets TST can be accessed over one and the same subscriber line TS1. As in the case of a conventional line concentrator, a superordinated transmission control T-ÜST precedes the subscriber sets TST. This transmission control combines in outgoing direction the transmission bands assigned to the individual subscriber sets for transmission over the common subscriber line TL1 and assigns them in incoming direction to the subscriber sets. Accordingly, in the switching center VST a similar transmission control V-ÜST is connected to the subscriber line TL1 operating the trunk termination AS allocated to individual subscribers. The required bandwidth of the subscriber line TS1 corresponds to the multiple of the independent subscriber sets accessible over a subscriber line. The channels for the individual radio and television programs P1 to Pn need not be provided separately in each transmission band allocated to individual subscribers, but the programs may be transmitted together for all subscriber sets in a separate transmission band so that the necessary bandwidth is reduced. There is no need to feed the radio and television programs over the trunk terminations AS of the switching center allocated to individual subscribers; this may take place in the superordinated transmission circuit V-ÜST. However, a prerequisite is the allocation of the selected programs through individual coupling switches in the station-side transmission control T-ÜST.

2. As in conventional telephone systems, a PBX having a multiplicity of subscriber sets may also be connected to a public switching center. This would result in a schematic diagram similar to the one shown in FIG. 2, with the differences, however, that instead of subscriber sets, a switching center as illustrated in FIG. 1 is connected by the outputs of the switching networks FN, BN and PN to the transmission control T-ÜST. The various transmission bands of the subscriber line TL1 and the associated trunk terminations AS are not permanently assigned to the subscriber sets in the PBX, but may be assigned freely in a manner in itself known. In order that every subscriber may still receive the radio and television programs independently of telephone and other broadband traffic, the programs are continually transmitted in a separate transmission band of the subscriber line TL1. This transmission band thus works as an extended program bus of the public switching center.

3. Also, the sole communication of radio and television programs independently of telephone and other broadband traffic is possible through a switching center, be it PBX or public switching center. In the switching center, the subscriber line is connected over a trunk termination solely to the switching network PN for the desired programs, and in the subscriber set the necessary expense for the control device TSE depicted in FIG. 1 is limited to the trunk circuit LS, the signal generator SG and the monitoring circuit VR with the connected devices.

In total, a very advantageous data switching center is realized, in particular one which results in considerable operational ease on the part of the user.

A preferred embodiment of the invention is described in detail hereinabove along with brief descriptions of possible variations of that embodiment. This description should not be considered as defining the scope of the invention. The described embodiment can be modified or changed, or other variations of it provided while remaining within the scope of the invention as defined by the appended claims.

I claim:

1. In a data switching system having a plurality of subscriber sets, each connected to a switching center by a transmission line having a bandwidth sufficiently great to be capable of handling frequencies in a range permitting transmission of telephony frequencies, radio and television program frequencies, video telephone signals and data communications between connected subscriber sets, the improvement comprising:

telephone circuit means, character generator means, video transmitter and receiver means, data terminal means, common control means and a common trunk circuit in each said subscriber set, said common control means including means for selectively connecting one or more than one of the others of said means constituting said subscriber set in accordance with the selected modes of operation to said common trunk circuit, a common subscriber line having one end connected to said common trunk circuit, said switching center including a multisectional switching network having a section for receiving and switching telephone traffic, a section for receiving and switching television and radio program traffic and a section including an input for operating alone or in conjunction with said telephone switching section for receiving video telephone and other data signals, said sections of said multisectional switching network being, respectively, independently operable and a common line termination circuit having an output terminal connected to the other end of said common subscriber line and inputs connected, respectively, to outputs from said sections of said multisectional switching network.

2. The improved data switching system defined in claim 1 further comprising:
signal generator means for producing and sending to said switching center a signal indicative of the selected mode of operation.

3. The improved data switching system defined in claim 2 wherein said common control means includes logic circuit means for monitoring the operations of the components of said subscriber set means, ascertaining the selected mode of operation and causes transmission of the signal from said generator means to said switching center.

4. The improved data switching system defined in claim 2 wherein said common control means includes mode selection switch means for causing the connection of components of said subscriber set needed for a selected mode of operation.

5. The improved data switching system defined in claim 1 further comprising:
means in said switching center responsive to said character generator means for selecting specific portions of a selected mode of operation.

6. The improved data switching system defined in claim 5 further comprising:
storage means for storing the mode identifying signals from said signal generator means and
means for interpreting output signals from said character generator means differently from said mode identifying signals.

7. The improved data switching system defined in claim 6 where, when two modes of operation are actuated concurrently, means in said subscriber set emits a signal to said switching center ensuring assignment of the pulsing signals to one of the active modes of operation in addition to the signals emitted from said character generator means.

8. The improved data switching system defined in claim 7 wherein upon completion of a given mode of operation a sign-off signal is sent to said switching center for extinguishing the storage of said mode identifying signals.

9. The improved data switching system defined in claim 8 wherein the signals emitted from said character generator means and said mode identifying signals are transmitted in the voice frequency range.

10. The improved data switching system defined in claim 1 further comprising:
a power source in said switching center connected by means of a subscriber line for supplying power to said telephone circuit means and to said character generator means.

11. The improved data switching system defined in claim 1 wherein said switching center includes multiple sources of television and radio programs transmitting in different time or frequency channels connected by means of parallel coupling elements to said input for television and radio programs, said subscriber sets including converters adapted to receive, respectively, said different time or frequency channels.

12. The improved data switching system defined in claim 1 wherein a plurality of said subscriber sets are connected to a common subscriber line, said common transmission line having a sufficiently broad bandwidth so as to accomodate a number of radio and television programs being transmitted in separate bands.

13. The improved data switching system defined in claim 11 further comprising additional receivers in a said subscriber set having a program selector controlling the program selection in said switching center.

* * * * *